(12) United States Patent
Estable et al.

(10) Patent No.: US 9,881,324 B2
(45) Date of Patent: *Jan. 30, 2018

(54) APPARATUS AND METHOD OF WIRELESS INSTANT MESSAGING

(71) Applicant: BlackBerry Limited, Waterloo (CA)

(72) Inventors: Luis Estable, Gatineau (CA); Risvan Coskun, Kanata (CA); Robert D. Oliver, Victoria (CA); Haining Zhang, Cupertino, CA (US)

(73) Assignee: BlackBerry Limited, Waterloo, Ontario (CA)

(*) Notice: Subject to any disclaimer, the term of this patent is extended or adjusted under 35 U.S.C. 154(b) by 698 days.

This patent is subject to a terminal disclaimer.

(21) Appl. No.: 14/506,860

(22) Filed: Oct. 6, 2014

(65) Prior Publication Data
US 2015/0026093 A1 Jan. 22, 2015

Related U.S. Application Data

(63) Continuation of application No. 13/029,704, filed on Feb. 17, 2011, now Pat. No. 8,868,047, which is a
(Continued)

(51) Int. Cl.
H04M 3/42 (2006.01)
G06Q 30/02 (2012.01)
(Continued)

(52) U.S. Cl.
CPC ..... *G06Q 30/0281* (2013.01); *G06Q 30/0209* (2013.01); *G06Q 30/0258* (2013.01);
(Continued)

(58) Field of Classification Search
CPC .......... G06Q 30/0181; G06Q 30/0209; G06Q 30/0258; G06Q 30/0269; H04L 51/04;
(Continued)

(56) References Cited

U.S. PATENT DOCUMENTS 6,091,956 A 7/2000 Hollenberg
6,253,091 B1 6/2001 Naddell et al.
(Continued)

FOREIGN PATENT DOCUMENTS

CA 2499524 A1 4/2004
EP 1176840 A1 1/2002
(Continued)

OTHER PUBLICATIONS

Office Action dated Nov. 5, 2014 issued in related/corresponding Canadian Application No. 2,726,830 filed Sep. 19, 2003.
(Continued)

*Primary Examiner* — Wayne Cai
(74) *Attorney, Agent, or Firm* — Conley Rose, P.C.; J. Robert Brown, Jr.

(57) ABSTRACT

A wireless communication device declares one of a plurality of extended instant messaging states and transmits the declared states to a presence information server. Declared extended instant messaging states for destination devices are received, and an enhanced instant message based on declared extended instant messaging states is generated.

20 Claims, 7 Drawing Sheets

Related U.S. Application Data continuation of application No. 11/360,363, filed on Feb. 23, 2006, now Pat. No. 8,121,582, which is a continuation of application No. 10/667,094, filed on Sep. 19, 2003, now Pat. No. 7,020,480.

(60) Provisional application No. 60/411,744, filed on Sep. 19, 2002.

(51) Int. Cl.

| | | |
|---|---|---|
| *H04L 12/58* | (2006.01) | |
| *H04W 4/02* | (2009.01) | |
| *H04W 4/12* | (2009.01) | |
| *H04W 4/20* | (2009.01) | |
| *H04W 8/10* | (2009.01) | |
| *H04L 29/08* | (2006.01) | |

(52) U.S. Cl.
CPC ......... *G06Q 30/0269* (2013.01); *H04L 51/04* (2013.01); *H04L 51/043* (2013.01); *H04L 51/38* (2013.01); *H04L 67/18* (2013.01); *H04L 67/22* (2013.01); *H04L 67/24* (2013.01); *H04W 4/02* (2013.01); *H04W 4/12* (2013.01); *H04W 4/20* (2013.01); *H04W 8/10* (2013.01); *H04L 69/329* (2013.01)

(58) Field of Classification Search
CPC ....... H04L 51/38; H04L 51/043; H04L 67/18; H04L 67/22; H04L 67/24; H04L 69/329; H04W 8/10; H04W 4/02; H04W 4/12; H04W 4/20
USPC ...... 455/404.2, 466, 414.1, 414.2, 518, 519; 705/14.66, 14.56, 14.12
See application file for complete search history.

(56) References Cited

U.S. PATENT DOCUMENTS

| | | | |
|---|---|---|---|
| 6,687,608 | B2 | 2/2004 | Sugimoto et al. |
| 6,829,475 | B1 | 12/2004 | Lee et al. |
| 7,020,480 | B2 | 3/2006 | Coskun et al. |
| 7,024,205 | B1 | 4/2006 | Hose |
| 7,024,295 | B2 | 4/2006 | Hose |
| 7,027,801 | B1 | 4/2006 | Hall et al. |
| RE39,119 | E | 6/2006 | Serizawa et al. |
| 7,305,350 | B1 | 12/2007 | Bruecken |
| 8,121,582 | B2 | 2/2012 | Coskun et al. |
| 8,868,047 | B2 | 10/2014 | Coskun et al. |
| 2001/0003202 | A1 | 6/2001 | Mache |
| 2002/0034941 | A1 | 3/2002 | Patil |
| 2002/0035605 | A1 | 3/2002 | McDowell et al. |
| 2002/0068554 | A1 | 6/2002 | Dusse |
| 2002/0077896 | A1 | 6/2002 | Liu et al. |
| 2002/0133406 | A1 | 9/2002 | Kujirai et al. |
| 2002/0163547 | A1 | 11/2002 | Abramson et al. |
| 2003/0050815 | A1 | 3/2003 | Seigel et al. |
| 2003/0095570 | A1 | 5/2003 | Uramatsu et al. |
| 2004/0015569 | A1 | 1/2004 | Lonnfors et al. |
| 2004/0198379 | A1 | 10/2004 | Magee et al. |
| 2004/0203852 | A1 | 10/2004 | Janakiraman |
| 2005/0027591 | A9 | 2/2005 | Gailey et al. |

FOREIGN PATENT DOCUMENTS

| | | |
|---|---|---|
| WO | 0062564 | 10/2000 |
| WO | 0137597 A1 | 5/2001 |
| WO | 0156308 A2 | 8/2001 |
| WO | 02065250 A2 | 8/2002 |

OTHER PUBLICATIONS

USPTO: Office Action for U.S. Appl. No. 11/360,363 dated Mar. 25, 2011 (15 pages).
Ericsson, Motorola, and Nokia: "Wireless Village Initiative," White Paper, 2001.
3rd Generation Partnership Project: TS23.141, Jun. 2002.
CIPO: Requisition by the Examiner (office action) for Patent Application No. 2726830 dated Jun. 9, 2011 (2 pages).
Office Action dated Jun. 28, 2005; U.S. Appl. No. 10/667,094, filed Sep. 19, 2003; 20 pages.
Notice of Allowance dated Dec. 22, 2005; U.S. Appl. No. 10/667,094, filed Sep. 19, 2003; 4 pages.
Office Action dated Nov. 16, 2007; U.S. Appl. No. 11/360,363, filed Feb. 23, 2006; 13 pages.
Final Office Action dated May 12, 2008; U.S. Appl. No. 11/360,363, filed Feb. 23, 2006; 11 pages.
Final Office Action dated Jul. 22, 2008; U.S. Appl. No. 11/360,363, filed Feb. 23, 2006; 10 pages.
Advisory Action dated Nov. 4, 2008; U.S. Appl. No. 11/360,363, filed Feb. 23, 2006; 7 pages.
Office Action dated Mar. 6, 2009; U.S. Appl. No. 11/360,363, filed Feb. 23, 2006; 12 pages.
Final Office Action dated Sep. 29, 2009; U.S. Appl. No. 11/360,363, filed Feb. 23, 2006; 12 pages.
Office Action dated Jan. 21, 2010; U.S. Appl. No. 11/360,363, filed Feb. 23, 2006; 11 pages.
Final Office Action dated Jul. 14, 2010; U.S. Appl. No. 11/360,363, filed Feb. 23, 2006; 18 pages.
Advisory Action dated Sep. 28, 2010; U.S. Appl. No. 11/360,363, filed Feb. 23, 2006; 11 pages.
Final Office Action dated Jul. 20, 2011; U.S. Appl. No. 11/360,363, filed Feb. 23, 2006; 20 pages.
Notice of Allowance dated Oct. 20, 2011; U.S. Appl. No. 11/360,363, filed Feb. 23, 2006; 9 pages.
Office Action dated Jun. 15, 2011; U.S. Appl. No. 13/029,704, filed Feb. 17, 2011; 17 pages.
Final Office Action dated Nov. 1, 2011; U.S. Appl. No. 13/029,704, filed Feb. 17, 2011; 21 pages.
Office Action dated Apr. 18, 2013; U.S. Appl. No. 13/029,704, filed Feb. 17, 2011; 14 pages.
Final Office Action dated May 16, 2013; U.S. Appl. No. 13/029,704, filed Feb. 17, 2011; 14 pages.
Office Action dated Jul. 15, 2013; U.S. Appl. No. 13/029,704, filed Feb. 17, 2011; 13 pages.
Final Office Action dated Sep. 6, 2013; U.S. Appl. No. 13/029,704, filed Feb. 17, 2011; 13 pages.
Office Action dated Nov. 13, 2013; U.S. Appl. No. 13/029,704, filed Feb. 17, 2011; 14 pages.
Final Office Action dated Mar. 17, 2014; U.S. Appl. No. 13/029,704, filed Feb. 17, 2011; 15 pages.
Notice of Allowance dated Jun. 20, 2014; U.S. Appl. No. 13/029,704, filed Feb. 17, 2011; 7 pages.
PCT International Search Report; Application No. PCT/CA03/01430; dated Jul. 16, 2004; 3 pages.
PCT Written Opinion; Application No. PCT/CA03/01430; dated Oct. 27, 2004; 7 pages.
Canadian Office Action; Application No. 2,499,524; dated Dec. 23, 2008; 2 pages.
European Examination Report; Application No. 03750198.8; dated Sep. 14, 2005; 3 pages.
European Examination Report; Application No. 03750198.8; dated Aug. 23, 2006; 3 pages.
Canadian Office Action; Application No. 2,726,830; dated Jul. 23, 2013; 2 pages.
Canadian Office Action; Application No. 2,726,830; dated Jul. 14, 2014; 3 pages.

APPARATUS AND METHOD OF WIRELESS INSTANT MESSAGING

CROSS REFERENCE TO RELATED APPLICATION

This is a continuation of U.S. application Ser. No. 13/029,704, filed Feb. 17, 2011, which is a continuation of U.S. application Ser. No. 11/360,363, filed Feb. 23, 2006, now U.S. Pat. No. 8,121,582, which is a continuation of U.S. application Ser. No. 10/667,094, filed Sep. 19, 2003, now U.S. Pat. No. 7,020,480, which claims the benefit of U.S. Provisional Application No. 60/411,744, filed Sep. 19, 2002. All the above applications are hereby incorporated herein by reference.

TECHNICAL FIELD

The patent application relates generally to techniques for instant messaging. More particularly, the invention described herein provides an apparatus and method for instant messaging with wireless devices.

BACKGROUND

Instant Messaging (IM) applications require solutions to two problems: (1) sending short messages; and (2) the problem of maintaining presence information.

Known Instant Messaging (IM) techniques, such as ICQ, typically address both short messaging and presence information issues by sending peer-to-peer data over IP (Internet protocol). In ICQ, IP packets are sent between ICQ clients to both send short messages and to maintain presence information. For any one ICQ client, the presence information of a select group of other ICQ clients is typically maintained in a "buddy list", so that when the user of an ICQ client consults the list, the user knows if any of the corresponding users in the "buddy list" are available for instant messaging, or if they are not. IM presence information in ICQ is defined using states such as connected, chatty, away, extended away, occupied, do not disturb (DND), invisible, and offline.

Known wireless networks are capable of sending data between wireless devices. Such wireless networks may include the GSM (Global System for Mobile) and GPRS (Generalized Packet Radio Service), modern Code Division Multiple Access (CDMA) networks and third-generation (3G) networks like Enhanced Data-rates for Global Evolution (EDGE) and Universal Mobile Telecommunications Systems (UMTS), currently under development. Some of these networks are also capable of sending peer-to-peer data over IP.

One skilled in the art might assume that simply providing IP-based IM clients, such as ICQ, on wireless devices is an acceptable solution to the problem of conducting Instant Messaging on wireless networks. However, although known wireless networks are capable of IP communication, this solution is not well adapted to wireless resources. For instance, SMS (Short Messaging Service), although an available resource on various wireless networks, does not operate over IP and therefore may not be used to solve the message-sending problem at the wireless device if IP clients, such as ICQ, are used. Furthermore, simply using IP clients, such as ICQ, may cause frequent network traffic communications typical of non-wireless IP networks, which could exceed typical wireless network capacity.

SUMMARY

A wireless communication device declares one of a plurality of extended instant messaging states and transmits the declared states to a presence information server. Declared extended instant messages states for destination devices are received, and an enhanced instant message based on declared extended instant messaging states is generated.

DETAILED DESCRIPTION OF THE DRAWINGS

Figure 1:
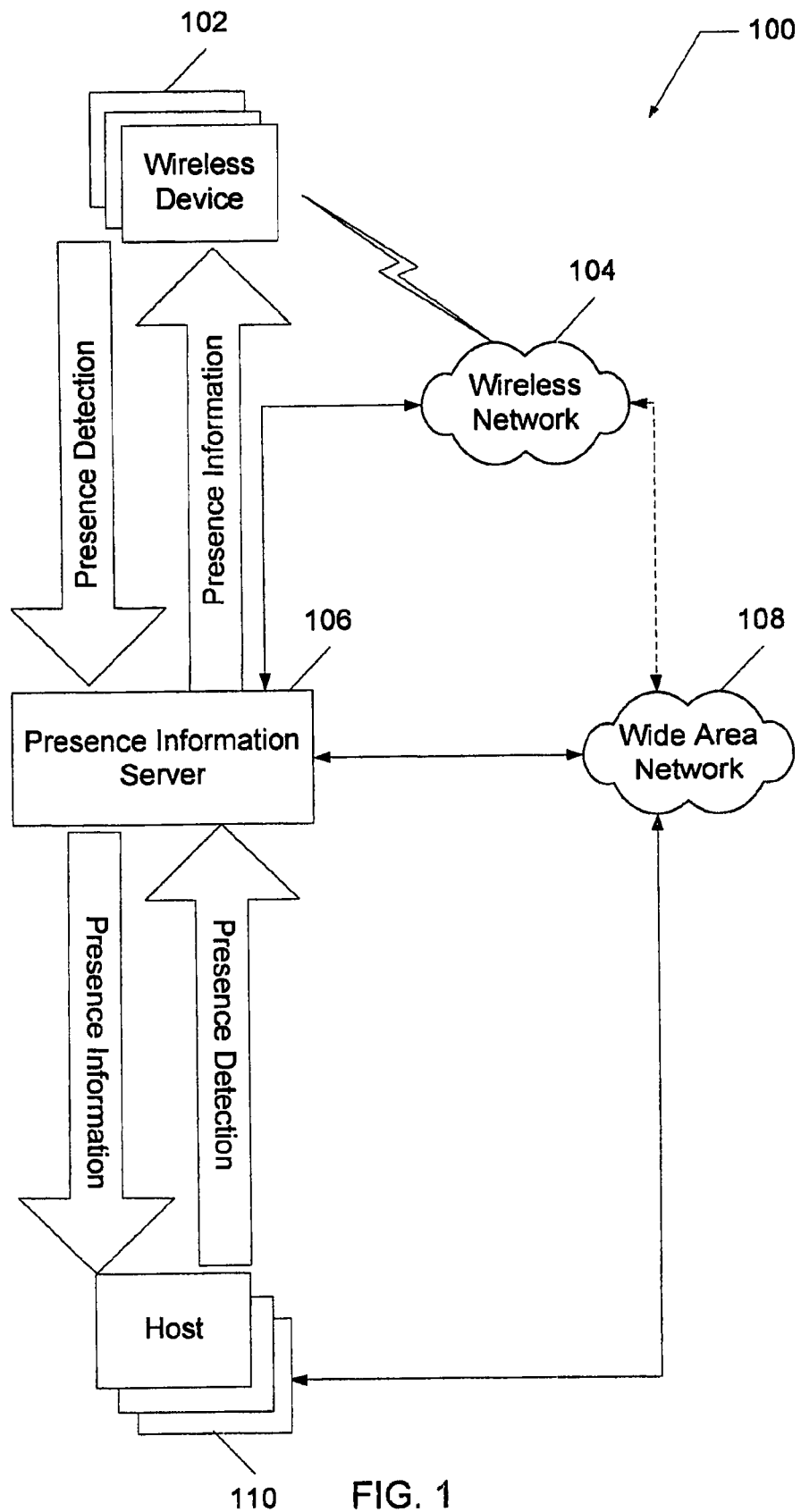
FIG. 1 is a block diagram of an instant messaging apparatus.

FIG. 1 is a block diagram of an instant messaging apparatus. Wireless devices 102 communicate on a wireless network 104, and with hosts 110 via a wide area network 108. Communications can include data and/or voice communications if the wireless device 102 is so enabled, but at least include data communications. Data communications preferably include instant communications, which are enhanced by a presence information server 106 that is connected to both the wireless network 104 and the wide area network 108. Although wireless network 104 may connect directly to wide area network 108, it is preferred that wireless network 104 communicate with wide area network 108 via the presence information server 106. Presence related data and signalling may also preferably be communicated via the presence server 106.

The presence information server 106 may track both wireless devices 102 and hosts 110. When tracking wireless devices 102, the presence information server 106 detects the presence of select users of wireless devices. When tracking hosts 110, the presence information server 106 detects the presence of select users at the hosts or the presence of select services provided by the hosts. Selection of which wireless devices and hosts are tracked can be either contingent on registration of the wireless devices and hosts to ensure privacy or mandatory to ensure security.

The presence information server 106 may selectively store presence information corresponding to the detected wireless devices and also corresponding to the detected hosts. In the case of detected wireless devices, presence information may include an extended instant messaging state. The extended instant messaging states includes traditional presence states, as well as activity states, proximity states, communication states, and more generally states that can be extended to best suit specific instant messaging applications. Each of these extended states will be described in greater detail in example applications below. The stored presence information can be optionally tagged with various accessibility attributes, such as private or public, for example, to limit access to the presence information based on the attributes.

The presence information server 106 may selectively share the stored presence information with interested devices or hosts to enhance instant communications. As with the selection of detected devices and hosts, selection of which wireless devices and hosts share presence information can be either contingent on registration of the wireless devices and hosts to ensure privacy, or mandatory to ensure security.

Operationally, the wireless devices 102 communicate with the hosts 110 via the presence information server 106, although if an optional direct connection between wireless network 104 and wide area network 108 exists, communications between wireless devices 102 and hosts 110 may bypass presence information server 106. Regardless of what route communications take, the tracking of devices and hosts, the storing of presence information, and the sharing of presence information enhance communications.

A first example application of the apparatus 100 of FIG. 1 is wireless instant messaging. Wireless instant messaging is the base application onto which other instant applications can be added by extending the instant messaging states. In wireless instant messaging, an instant message is sent from a source to a destination where either: at least one of the source and destination is a wireless device; or both source and destination are wireless devices. Since wireless devices are inherently capable of mobility, the wireless network inherently performs some tracking Therefore presence information server 106 can detect the presence of at least one of the source or destination of a wireless instant message by co-operating with the wireless network and either polling the status or receiving status updates from the wireless network. Advantageously, the wireless devices need not send any additional messages to the presence information server or to instant messaging correspondents to have their basic presence tracked and shared by the presence information server. Furthermore, because at most only one of the source or destination of a wireless instant message is a host connected via wide area network 108, traditional instant messaging techniques can be used to detect the presence information of the host, if necessary. Thus, before a wireless instant message is sent from a wireless device source that has registered an interest in the instant message destination with the presence information server, the presence information of the destination can be shared with the wireless device source in order to enhance the instant message. The instant message can be enhanced by, for example, altering the content of the message based upon the location of the destination, or by altering the message format. Similarly, when a wireless instant message is received at a wireless device destination that has registered an interest in the instant message source, the presence information of the source can be shared with the wireless device destination in order to enhance the instant message.

The precise form of tracking done by the wireless network depends on the particular wireless network used. For instance, if the wireless network has cells which are divided into sectors, then as a wireless device travels from sector to sector, and from cell to cell, the wireless network inherently knows what sector and/or cell the wireless device is present in. Therefore, this presence information need not be detected separately for each wireless device by the presence information server, but instead is detected for many wireless devices by the presence information server co-operating with the wireless network, which for instance may already have the cell and/or sector information stored in any one of many location registers, such as an HLR (Home Location Register) or VLR (Visiting Location Register). The presence information server can further add to the presence detection by obtaining a precise instant location of the wireless devices. For instance, if a wireless device is equipped with GPS (Global Positioning System), or if the wireless network is equipped with triangulation technology, then the presence information server can poll the wireless device for a GPS reading or request triangulation of a wireless device from the wireless network. The presence information server can further add to the presence detection by correlating presence with connection context, for instance by using lookup tables that map IP addresses to device identifiers.

A second example application of the apparatus 100 of FIG. 1, which builds on the above presence detection and base instant messaging application, is the extension of presence states to include user activity states, such as looking, shopping, visiting, etc. In a user activity application, the wireless device user voluntarily declares one or more activity states to the presence information server, which in turn notes the particular activity interests that a wireless device user may have at that instant. The presence information server then uses the detected presence information and activity states to select hosts and/or wireless devices that have an instant interest that matches one or more of the activity states of the wireless device. Thus, if the wireless device is detected to be present at a cell or sector near a shopping mall, and a host is present in the shopping mall, then if the user of the wireless device declares a shopping activity to the presence information server, the latter selects the host present at the shopping mall to instantly message the wireless device thereby enabling instant shopping.

Similarly, if the wireless device user declares a looking state, the presence information server can, depending on the precise nature of the location of the device detected, select a host related to the location of the wireless device in order to have the host instantly message possible choices to narrow down what the wireless device user is looking at. If only the cell or sector is known, then a GIS (geographical information server) host can be selected by the presence information server to instantly send a message to the wireless device and ask the wireless device user to pinpoint their location, for instance by providing a URL to a map. Then, given a precise enough location such as a museum, the presence information server could then select a host related to the museum and have the museum host instantly message the wireless device with more options to further narrow down what the user is looking at, for instance a painting on the third floor, south wall. The museum host could then help "track" the user using short-range communications and instantly message the user with information about what he is looking at while the user declares a looking state, in co-operation with the presence information server.

Other activity states may be the visiting state, whereby a wireless device user is not in their home location. This can be detected by the presence information server, for instance by consulting location registers such as an HLR or a VLR of the wireless network, or can be explicitly declared to the presence information server by the user. Further details of the visiting activity state will be described next in relation to the next example application of instant messaging.

A third example application of the apparatus 100 of FIG. 1, which builds on the above presence detection, base instant messaging application, and user activity application, is the extension of presence states to include contact proximity states, such as sector, cell, city, province, country, distance, etc. In a contact proximity application, the wireless device user voluntarily declares a proximity state for each of a plurality of contacts, as found for instance in an address book. The presence information server stores these contact proximity states for each wireless device so that, upon detection of the proximity between any two wireless devices according to the contact proximity states, the presence information server can instantly alert the wireless device user of the proximity of the corresponding contact and enable the wireless device user to instantly message the contact, for instance in order to establish a meeting location, or to "spread out" in a search and rescue operation. The resolutions of the proximity states are dependent on the infrastructure available on a wireless network and the capabilities of a wireless device. Thus, if a wireless device is equipped with GPS, fine resolution is possible where a fixed distance and even a direction can be prescribed, thereby allowing search and rescue teams to maintain a specific formation in real-time. Wireless networks are typically capable of resolutions by cell and/or sector, and knowledge of which cell and/or sector can be used to determine what city, province, country, continent, etc. any two wireless devices are in for the purposes of determining proximity.

As mentioned above, it is possible to couple user activity states with contact proximity states. For example, when a wireless device user is in a visiting user activity state, such as when travelling from one city to another, contact proximity states can be automatically enabled at the city resolution for those contacts that are in the currently visited city. Corresponding alerts could be automatically sent to the contacts if they had expressed an interest in the wireless device user, for instance if they were interested in meeting with the wireless device user. In this way, the wireless device user does not need to call on all his contacts to let them know he is in town, and the interested contacts are given an opportunity to instantly message the wireless device user.

A fourth example application of the apparatus 100 of FIG. 1, which builds on the above presence detection, base instant messaging application, is the extension of presence states to include communication states, such as broadband, narrowband, inhibit, low latency, high latency, etc. When a wireless device changes cell and/or sector, or changes from one wireless network to another, communication properties change and thus may influence the presence of the wireless device. For example, as a wireless device user leaves a rural area, such as the user's home, and drives into an urban area, such as the user's work, the wireless may access more than one cell. The rural cells may tend to have lower bandwidth than the urban cells, or the local wireless network at a work location. Thus, the presence information server can ensure that the wireless device user is only alerted for those instant messages that are appropriate given the communication state of the wireless device, for instance progressively enabling SMS messaging, email, and video-conferencing, respectively, as the communication capabilities of the wireless network cells and better wireless networks are located. Optionally, the presence information server forwards instant messages to a storage mechanism, such as the user's email inbox, if the instant communication capabilities of the wireless device do not permit the instant message.

Figure 2:
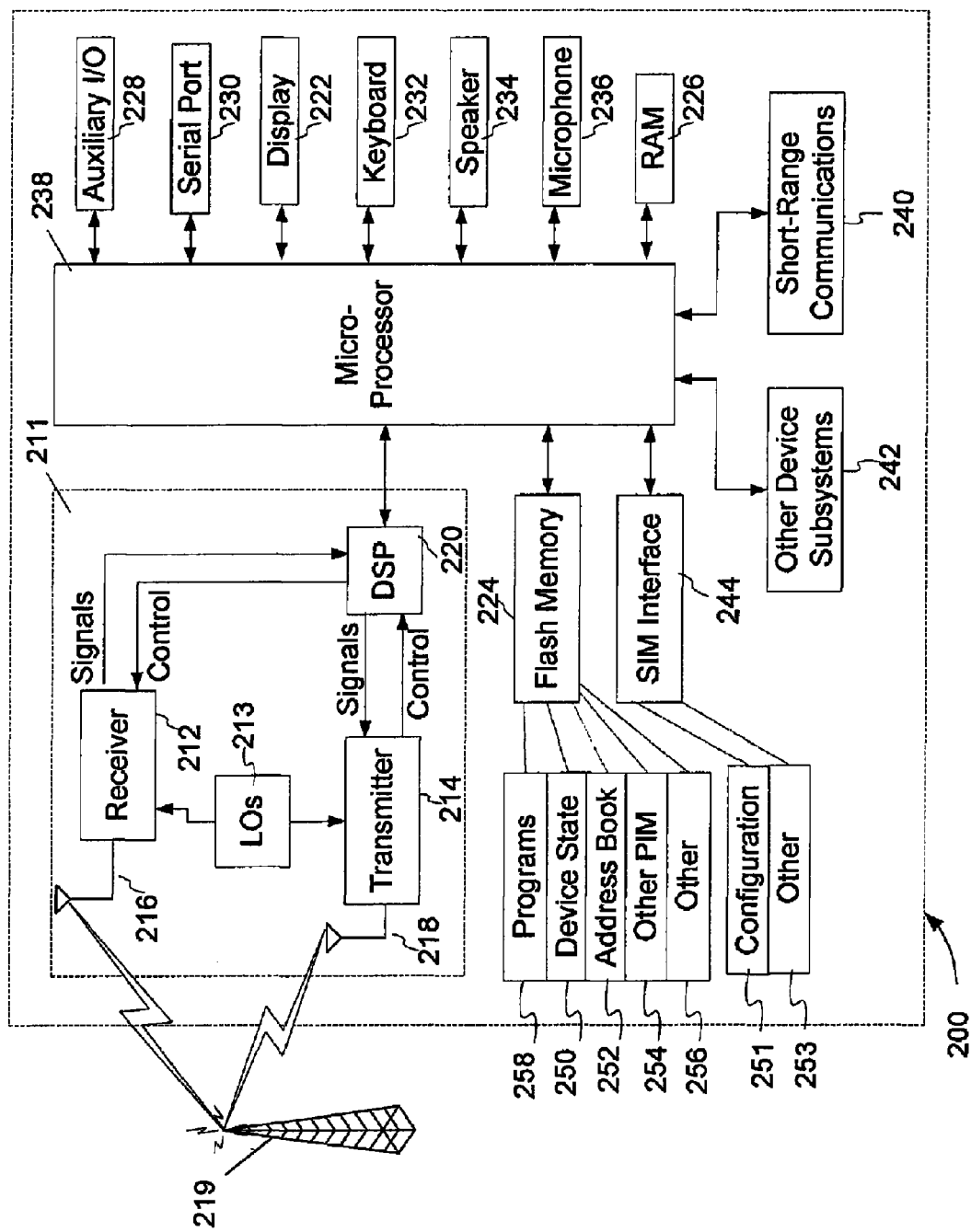
FIG. 2 is a block diagram of an instant messaging enabled cellular mobile station.

FIG. 2 is a block diagram of an instant messaging enabled cellular mobile station, which is one type of wireless communication device. Mobile station 200 is preferably a two-way wireless communication device having at least voice and data communication capabilities. Mobile station 200 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 200 is enabled for two-way communication, it will incorporate a communication subsystem 211, including both a receiver 212 and a transmitter 214, as well as associated components, such as one or more, preferably embedded or internal, antenna elements 216 and 218, local oscillators (LOs) 213, and a processing module such as a digital signal processor (DSP) 220. The particular design of the communication subsystem 211 will be dependent upon the communication network in which the device is intended to operate. For example, mobile station 200 may include a communication subsystem 211 designed to operate within the Mobitex™ mobile communication system, the DataTAC™ mobile communication system, or a GPRS network.

Network access requirements will also vary depending upon the type of network 219. For example, in the Mobitex and DataTAC networks, mobile station 200 is registered on the network using a unique identification number associated with each mobile station. In GPRS networks, however, network access is associated with a subscriber or user of mobile station 200. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 200 will be unable to carry out any other functions involving communications over the network 200. The SIM interface 244 is normally similar to a card-slot into which a SIM card can be inserted and ejected like a diskette or PCMCIA card. The SIM card can have approximately 64K of memory and hold many key configuration 251, and other information 253 such as identification, and subscriber related information.

When required network registration or activation procedures have been completed, mobile station 200 may send and receive communication signals over the network 219. Signals received by antenna 216 through communication network 219 are input to receiver 212, which may perform such common receiver functions as signal amplification, frequency down conversion, filtering, channel selection and the like, and in the example system shown in FIG. 2, analog to digital (A/D) conversion. A/D conversion of a received signal allows more complex communication functions, such as demodulation and decoding to be performed in the DSP 220. In a similar manner, signals to be transmitted are processed, including modulation and encoding for example, by DSP 220 and input to transmitter 214 for digital to analog conversion, frequency up conversion, filtering, amplification and transmission over the communication network 219 via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station 200 preferably includes a microprocessor 238 that controls the overall operation of the device. Communication functions, including at least data and voice communications, are performed through communication subsystem 211. Microprocessor 238 also interacts with further device subsystems, such as the display 222, flash memory 224, random access memory (RAM) 226, auxiliary input/output (I/O) subsystems 228, serial port 230, keyboard 232, speaker 234, microphone 236, a short-range communications subsystem 240 and any other device subsystems generally designated as 242.

Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list.

Operating system software used by the microprocessor 238 is preferably stored in a persistent store, such as flash memory 224, which may instead be a read-only memory (ROM) or similar storage element. The operating system, specific device applications, or parts thereof, may be temporarily loaded into a volatile memory such as RAM 226. Received communication signals may also be stored in RAM 226.

As shown, flash memory 224 can be segregated into different areas for both computer programs 258 and program data storage 250, 252, 254 and 256. These different storage types indicate that each program can allocate a portion of flash memory 224 for their own data storage requirements. Microprocessor 238, in addition to its operating system functions, preferably enables execution of software applications on the mobile station. A predetermined set of applications that control basic operations, including at least data and voice communication applications for example, will normally be installed on mobile station 200 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such a PIM application would preferably have the ability to send and receive data items via the wireless network 219. In a preferred embodiment, the PIM data items are seamlessly integrated, synchronized and updated, via the wireless network 219, with the mobile station user's corresponding data items stored or associated with a host computer system. Further applications may also be loaded onto the mobile station 200 through the network 219, an auxiliary I/O subsystem 228, serial port 230, short-range communications subsystem 240 or any other suitable subsystem 242, and installed by a user in the RAM 26 or preferably a non-volatile store for execution by the microprocessor 238. Such flexibility in application installation increases the functionality of the device and may provide enhanced on-device functions, communication-related functions, or both. For example, secure communication applications may enable electronic commerce functions and other such financial transactions to be performed using the mobile station 200.

In a data communication mode, a received signal, such as a text message or web page download, will be processed by the communication subsystem 211 and input to the microprocessor 238, which preferably further processes the received signal for output to the display 222, or alternatively to an auxiliary I/O device 228. A user of mobile station 200 may also compose data items, such as email messages for example, using the keyboard 232, which is preferably a complete alphanumeric keyboard or telephone-type keypad, in conjunction with the display 222 and possibly an auxiliary I/O device 228. Such composed items may then be transmitted over a communication network through the communication subsystem 211.

For voice communications, overall operation of mobile station 200 is similar, except that received signals are preferably output to a speaker 234 and signals for transmission are generated by a microphone 236. Alternative voice or audio I/O subsystems, such as a voice message recording subsystem, may also be implemented on mobile station 200. Although voice or audio signal output is preferably accomplished primarily through the speaker 234, display 222 may also be used to provide an indication of the identity of a calling party, the duration of a voice call, or other voice call related information for example.

Serial port 230 in FIG. 2, would normally be implemented in a personal digital assistant (PDA)-type mobile station for which synchronization with a user's desktop computer may be desirable, but is an optional device component. Such a port 230 would enable a user to set preferences through an external device or software application and would extend the capabilities of mobile station 200 by providing for information or software downloads to mobile station 200 other than through a wireless communication network. The alternate download path may, for example, be used to load an encryption key onto the device through a direct and thus reliable and trusted connection to thereby enable secure device communication.

A short-range communications subsystem 240 is a further optional component which may provide for communication between mobile station 200 and different systems or devices, which need not necessarily be similar devices. For example, the subsystem 240 may include an infrared device and associated circuits and components or a Bluetooth™ communication module to provide for communication with similarly-enabled systems and devices.

Figure 3:
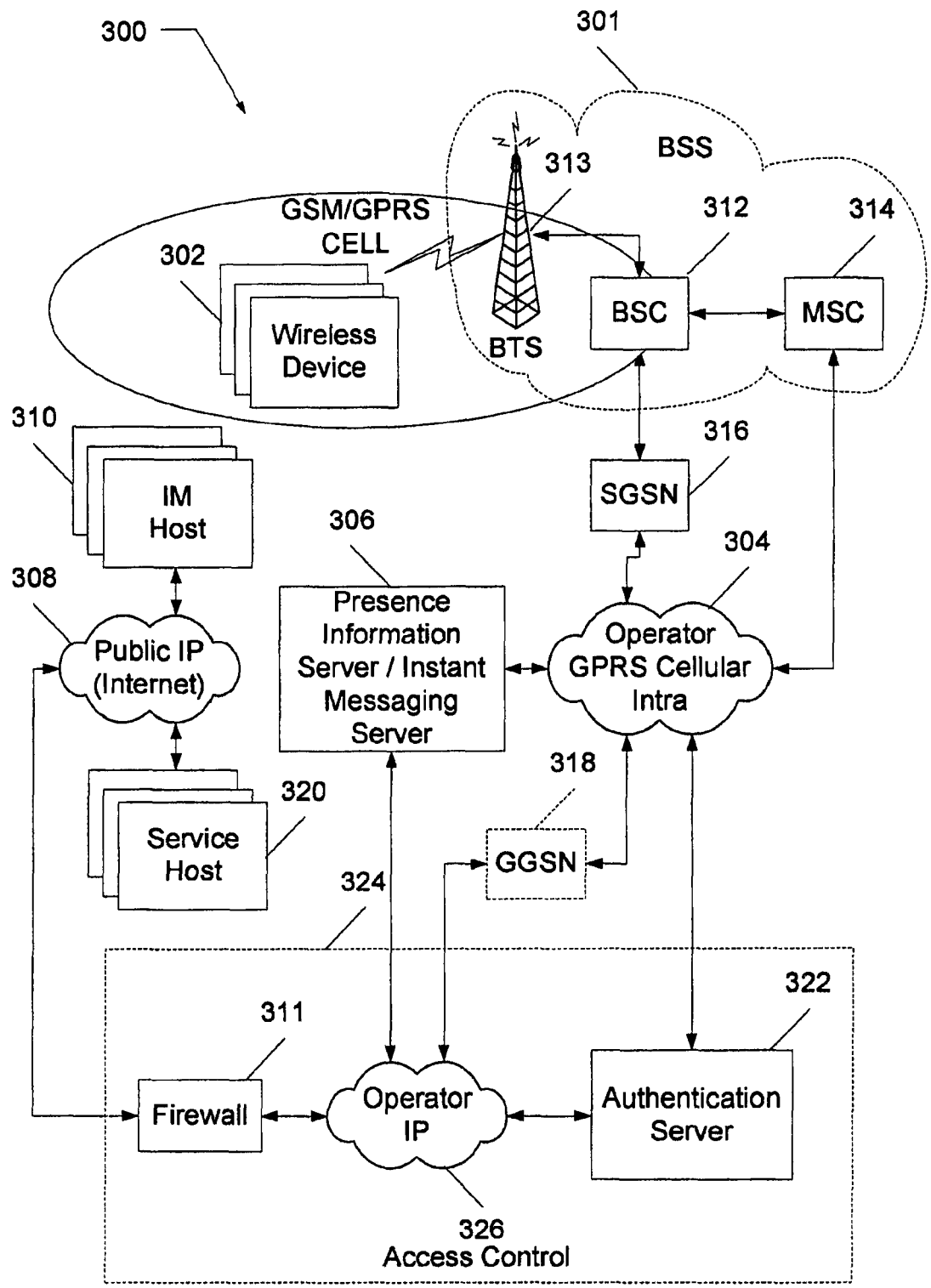
FIG. 3 is a block diagram of an instant messaging enabled GSM/GPRS network apparatus.

FIG. 3 is a block diagram of an instant messaging enabled GSM/GPRS network apparatus. In this instant messaging enabled GSM/GPRS network apparatus 300, wireless devices 302 communicate wirelessly via a Base Station Subsystem (BSS) 301. All radio access and radio packet transmission and conversion are done in the BSS 301, which includes a Base Transceiver Station (BTS) 313, a Base Station Controller (BSC) 312, and a Mobile Switching Centre (MSC) 314. In addition, a Serving GPRS Support Node (SGSN) 316 connects the BSS 301 to an operator GPRS cellular intra-network 304. The operator GPRS cellular intra-network 304 is also connected to an operator IP network 326 via a Gateway GPRS Support Node GGSN 318, similar to the SGSN. The operator GPRS cellular intra-network 304 is also connected to an authentication server 322 in order to authenticate users of wireless devices 302. Both the GGSN 318 and authentication server 322 are connected to the operator IP network 326, which connects to a public IP network, such as the Internet 308 via a firewall 311 to reach hosts such as service host 320 and instant messaging (IM) host 310. The firewall 311, operator IP network 326, and authentication server 322 provide an access control mechanism 324.

Operationally, a core GSM/GPRS network is used in the apparatus 300. In the core network, because MSCs are based upon circuit-switched central-office technology, and cannot handle packet traffic, two other core network components, the SGSN and GGSN enable data traffic. The SGSN can be viewed as a "packet-switched MSC"—it delivers packets to mobile stations (MSs) within its service area. SGSNs send queries to home location registers (HLRs) to obtain profile data of GPRS subscribers. SGSNs detect new GPRS MSs in a given service area, process registration of new mobile subscribers, and keep a record of their location inside a given area. The SGSN performs mobility management functions such as mobile subscriber attach/detach and location management. The SGSN is connected to the base-station subsystem via a Frame Relay connection to the PCU in the BSC. GGSNs are used as interfaces to external IP networks, such as the public Internet, other mobile service providers' GPRS services, or enterprise intranets. GGSNs maintain routing information that is necessary to tunnel protocol data units (PDUs) to the SGSNs that service particular wireless devices. Other functions include network and subscriber screening and address mapping. One (or more) GGSNs may be provided to support multiple SGSNs.

The wireless devices 302 can be any wireless data device capable of operating with BTS 313, and need not necessarily be IP based, although IP is preferred. When either voice or data traffic is originated at the wireless device 302, it is transported over the air interface to the BTS 313, and from the BTS 313 to the BSC 312 in the same way as a standard GSM voice call. However, at the output of the BSC 312, the traffic is separated—voice is sent to the MSC 314 per standard GSM, and data is sent to the SGSN 316. Each GPRS BSC 312 provides a physical and logical data interface out of the BSS 301 for packet data traffic. In order to co-operate with the presence information server 306, the BTS 313 may require a software upgrade, but typically will not require hardware enhancements depending on the manufacturer. The purpose of operator intra-network 304 is to interconnect operator network premises. Service hosts 320 are third party service providers based on the locations of the users. IM hosts 310 are other third party IM hosts to enable regular wired IM services, such as ICQ.

In addition to these components, apparatus 300 includes a presence information server/wireless instant messaging server 306, which couples the operator GPRS cellular intra-network 304 to the operator IP network and keeps track of the location of each user/device. By communicating with the GGSN and SGSN, the presence information server/wireless instant messaging server 306 can detect changes in HLRs and/or routing information in order to detect presence information.

In alternate embodiments of apparatus 300, the presence server/IM server 306 keeps track of location based on cellular infrastructure, triangulation techniques, or GPS systems. In other embodiments, the mobile devices may be able to operate with more than one wireless network, such as GSM and CDMA, for example. In these embodiments, location signals associated with one of the wireless networks may be used by the other network. For example, the GSM network may provide location information which can be provided to the CDMA network if the mobile device is communicating with the CDMA network, but is also capable of communicating with the GSM network simultaneously.

Figure 4:
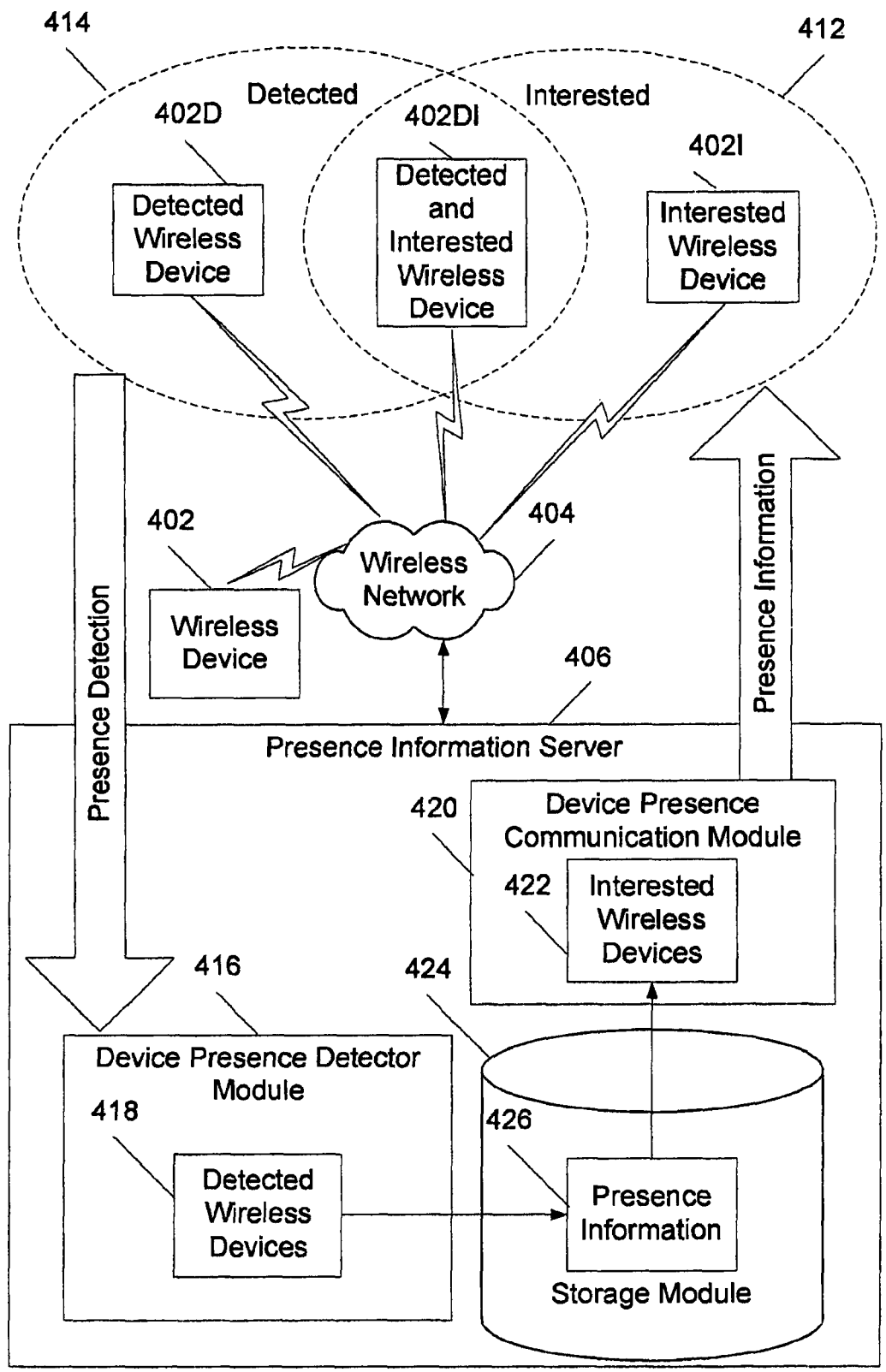
FIG. 4 is a block diagram of a wireless network view of the instant messaging server of FIG. 1.

FIG. 4 is a block diagram of a wireless network view of the instant messaging server of FIG. 1. As seen from the point of view of the wireless network 404, presence information server 406 enables presence detection and shares presence information with wireless devices 402. In particular, presence information server 406 attempts to track wireless devices 402, 402D, 402DI and 402I in order to detect the presence of a select number of the wireless devices. Presence information server tracks which wireless devices are detected and which wireless devices are interested, as illustrated by the Venn diagram composed of ovals 414 and 412 respectively representing the set of detected 402D and 402DI, as well as interested 402DI and 402I wireless devices. Note that detection and interest are independent concepts, and wireless devices can exist which, although operating on wireless network 404, are neither detected nor interested, such as wireless device 402, or are even both detected and interested as wireless device 402DI.

Presence information server 406 includes a device presence detector module 416, a storage module 424, and a device presence communication module 420. The device presence detector module 416 detects the presence of wireless devices and maintains detected wireless devices information 418. The detected wireless devices information 418 includes device identifiers, and any presence states detected by the device presence detector module 416 as well as presence states declared by the detected wireless devices. Device presence detector module 416 provides the detected wireless device information 418 to the storage module 424. The storage module 424 updates stored presence information 426 based on the detected wireless device information 418. The presence information 426 can include host presence information, as well as the device presence information, as will be more readily apparent in regard to FIG. 5. The device presence communication module 422 includes interested wireless device information 422. The interested wireless device information 422 includes the device identifiers of interested devices. Thus, the device presence communication module 420 reads the stored presence information 426 and selectively communicates the presence information to the interested wireless devices.

Figure 5:
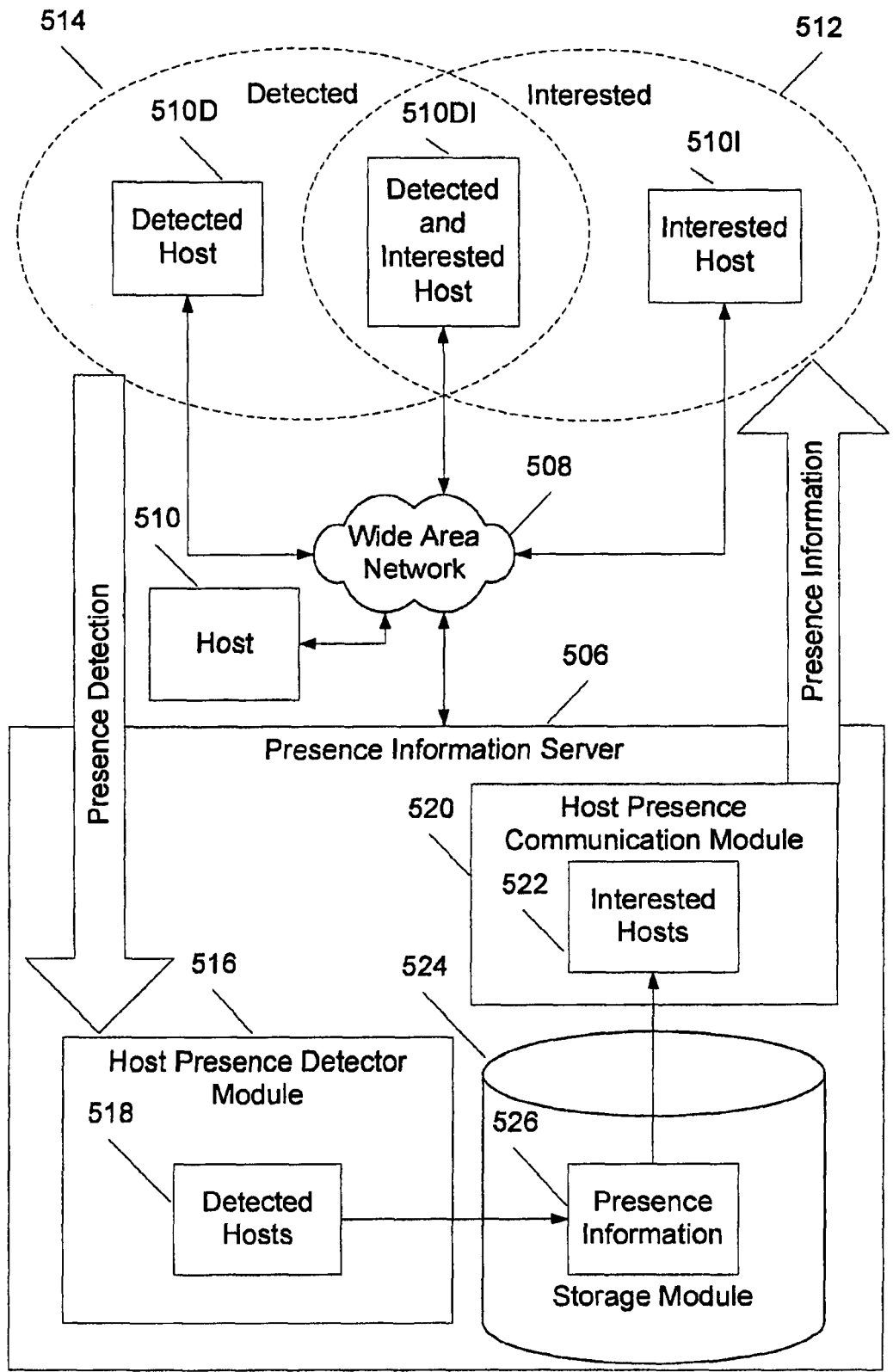
FIG. 5 is a block diagram of a wide area network view of the instant messaging server of FIG. 1.

FIG. 5 is a block diagram of a wide area network view of the instant messaging server of FIG. 1. As seen from the point of view of the wide area network 508, presence information server 506 enables presence detection and shares presence information with hosts 510. In particular, presence information server 506 attempts to track hosts 510, 510D, 510DI and 510I in order to detect the presence of a select number of the hosts. The presence information server tracks which hosts are detected and which hosts are interested, as illustrated by the Venn diagram, composed of ovals 514 and 512, respectively, representing the set of detected 510D and 510DI, as well as interested 510DI and 510I hosts. Note that detection and interest are independent concepts, and hosts can exist which, although operating on wide area network 508, are neither detected nor interested, such as host 510, or are both detected and interested as host 510DI.

Presence information server 506 includes a host presence detector module 516, a storage module 524, and a host presence communication module 520. The host presence detector module 516 detects the presence of hosts and maintains detected hosts information 518. The detected hosts information 418 includes host identifiers, and any presence states detected by the host presence detector module 516, as well as presence states declared by the detected hosts. Host presence detector module 516 provides the detected hosts information 418 to the storage module 524. The storage module 524 updates stored presence information 526 based on the detected hosts information 518. The presence information 526 can include device presence information, as well as the hosts presence information, as was more readily apparent in regard to FIG. 4. The device presence communication module 522 includes interested hosts information 522. The interested hosts information 522 includes the host identifiers of interested hosts. Thus, the host presence communication module 520 reads the stored presence information 526 and selectively communicates the presence information to the interested hosts.

Figure 6:
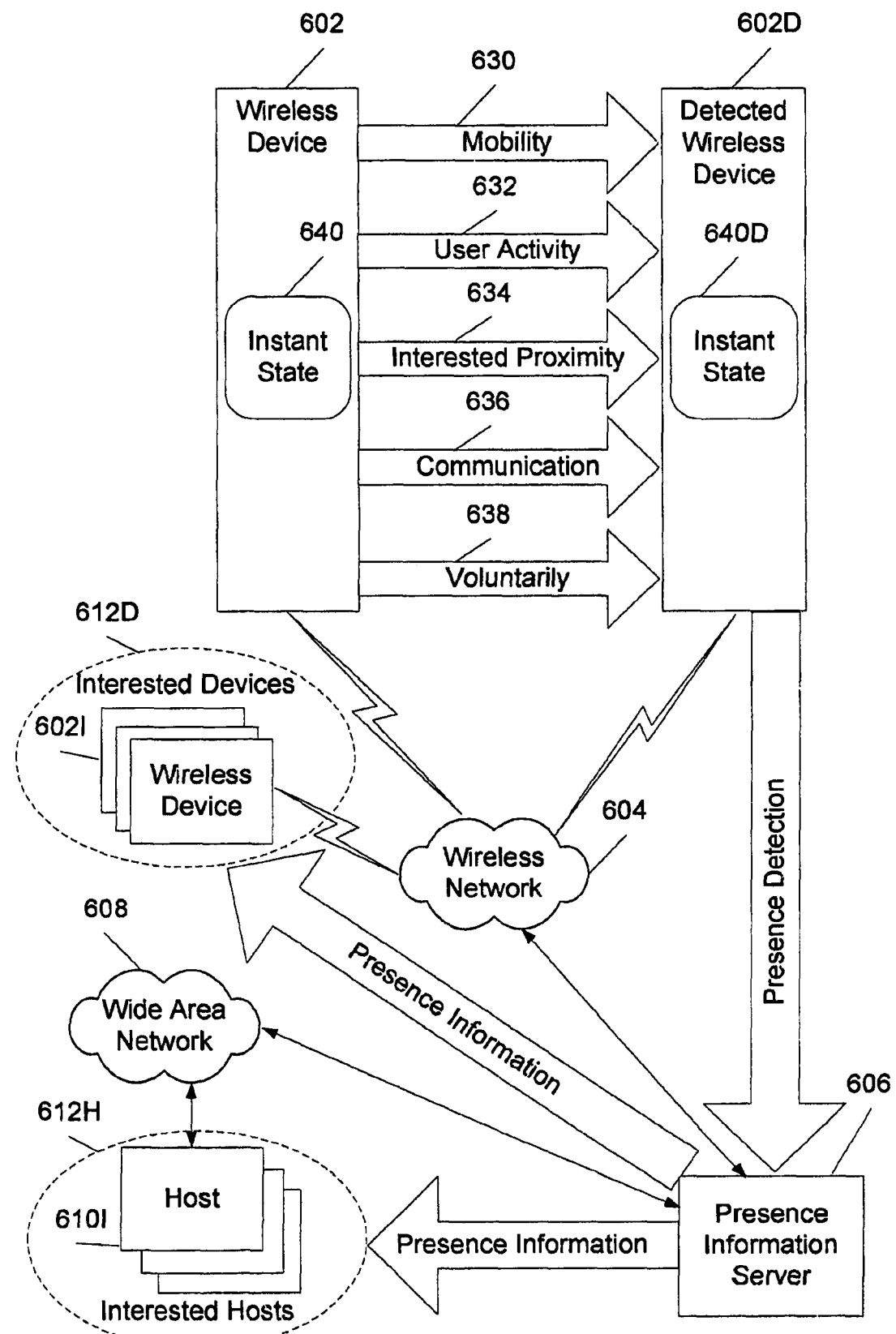
FIG. 6 is a data flow diagram illustrating a method of device presence detection of the instant messaging server of FIG. 3.

FIG. 6 is a data flow diagram illustrating a method of device presence detection of the instant messaging server of FIG. 3. A wireless device is illustrated at two different instances in time, an initial instance wireless device 602 and a subsequent instance wireless device 602D. Initially, wireless device 602 has an instant state 640 that represents the current presence state of the wireless device as known to it. One or more of a plurality of triggers, of which only 630, 632, 634, 636, 638 are illustrated, causes the wireless device initial instant state 640 to change to the wireless device subsequent instant state 640D.

Trigger events may include mobility triggered 630, whereby for instance the wireless device changes location; user activity triggered 632, whereby for instance the wireless device user is actively perusing some pre-determined and declared activity (shopping, looking, visiting, etc.); interested proximity triggered 634, whereby for instance the wireless device user has just been alerted of the proximity of a contact; communication triggered 636, whereby for instance the wireless device has just entered a high bandwidth wireless network cell; and voluntarily triggered 638, whereby the user of the wireless device declares an instant state change by operation of the wireless device.

Presence information server 606 detects the subsequent instant state 640D, and proceeds to share the presence information with interested devices 602I, as illustrated by the oval 612D, via wireless network 604, and with interested hosts 610I, as illustrated within the oval 612H, via wide area network 608, thereby enabling instant messaging to be selectively initiated between wireless device 602D, interested devices 602I and interested hosts 610I.

Figure 7:
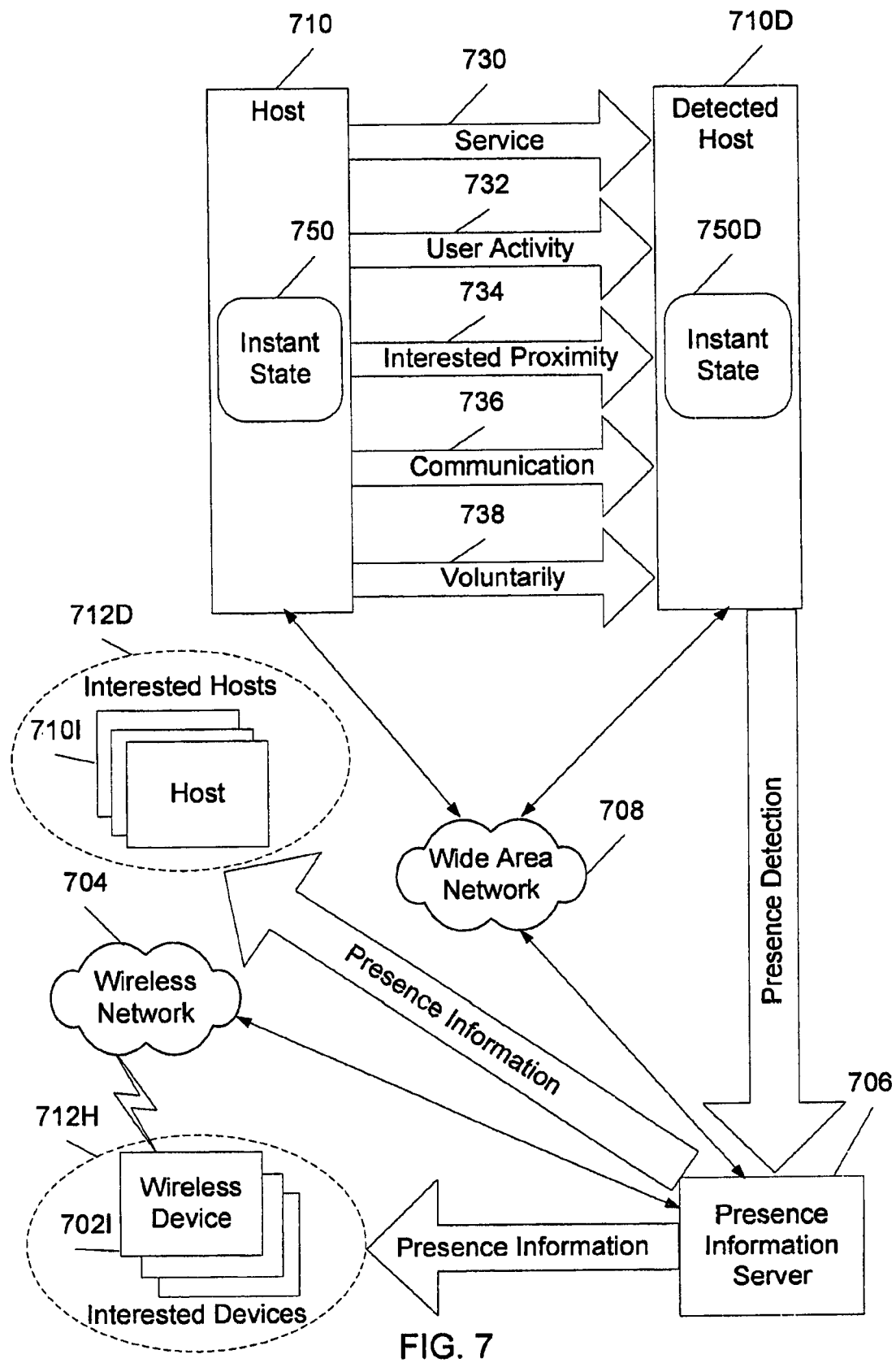
FIG. 7 is a data flow diagram illustrating a method of host presence detection of the instant messaging server of FIG. 5.

FIG. 7 is a data flow diagram illustrating a method of host presence detection of the instant messaging server of FIG. 5. A host is illustrated at two different instances in time, an initial instance host 710 and a subsequent instance host 710D. Initially, host 710 has an instant state 750 that represents the current presence state of the host as known to it. One or more of a plurality of triggers, of which only 730, 732, 734, 736, 738 are illustrated, causes the host initial instant state 740 to change to the host subsequent instant state 740D.

Trigger events may include service triggered 730, whereby for instance the host registers a service with presence information server 706; user activity triggered 732, whereby for instance the host user is actively perusing some pre-determined and declared activity (shopping, looking, visiting, etc.); interested proximity triggered 734, whereby for instance the host user has just been alerted of the proximity of a contact; communication triggered 736, whereby for instance the host has just accessed a high bandwidth network; and voluntarily triggered 638, whereby the user of the host declares an instant state change by operation of the host.

Presence information server 706 detects the subsequent instant state 750D, and proceeds to share the presence information with interested hosts 710I, as illustrated by the oval 712H, via wide area network 708, and with interested wireless devices 702I, as illustrated within the oval 712D, via wireless network 704, thereby enabling instant messaging to be selectively initiated between host 710D, interested devices 702I and interested hosts 710I.

The above-described embodiments of the present invention are intended to be examples only. Those of skill in the art may effect alterations, modifications and variations to the particular embodiments without departing from the scope of the invention.

The invention claimed is:

1. A method performed by a hardware server, comprising:
receiving an interest from an interested host;
receiving presence information regarding a wireless device, wherein the presence information identifies a current activity state of a user of the wireless device, the activity state being selected from the user currently looking, the user currently shopping and the user currently visiting; and
sending an alert to the interested host in response to detecting a match between the user's current activity state and the interest from the interested host.

2. The method of claim 1, wherein the activity state is declared by the user.

3. The method of claim 1, wherein the activity state is declared by the wireless device.

4. The method of claim 1, wherein the sending of an alert to the interested host is based on location of the wireless device.

5. The method of claim 4, wherein the sending of an alert to the interested host is based on location of the wireless device relative to location of the interested host.

6. The method of claim 1, wherein the interested host is associated with a merchant.

7. The method of claim 1, wherein the interested host is associated with a shopping mall.

8. The method of claim 1, further comprising:
in response to detecting a match between the interest from the interested host and the user's current activity state of shopping, arranging for the interested host to send a message to the user.

9. The method of claim 8, wherein the message is configured to initiate instant shopping between the interested host and the wireless device.

10. The method of claim 1, further comprising:
in response to detecting a match between the interest from the interested host and the user's current activity state of looking, arranging for the interested host to send a message to the user.

11. A server comprising:
a microprocessor configured to receive an interest from an interested host;
a communication subsystem configured to receive presence information regarding a wireless device, wherein the presence information identifies a current activity state of a user of the wireless device, the activity state being selected from the user currently looking, the user currently shopping and the user currently visiting,
wherein the communication subsystem is further configured to send an alert to the interested host in response to detecting a match between the user's current activity state and the interest from the interested host.

12. The server of claim 11, wherein the activity state is declared by the user.

13. The server of claim 11, wherein the activity state is declared by the wireless device.

14. The server of claim 11, wherein the sending of an alert to the interested host is based on location of the wireless device.

15. The server of claim 14, wherein the sending of an alert to the interested host is based on location of the wireless device relative to location of the interested host.

16. The server of claim 11, wherein the interested host is associated with a merchant.

17. The server of claim 11, wherein the interested host is associated with a shopping mall.

18. The server of claim 11, wherein the communication module is configured to:

in response to detecting a match between the interest from the interested host and the user's current activity state of shopping, arranging for the interested host to send a message to the user.

19. The server of claim 18, wherein the message is configured to initiate instant shopping between the interested host and the wireless device.

20. The server of claim 11, wherein the communication module is configured to:
in response to detecting a match between the interest from the interested host and the user's current activity state of looking, arranging for the interested host to send a message to the user.

\* \* \* \* \*